United States Patent
Berthoud et al.

(10) Patent No.: US 6,754,317 B1
(45) Date of Patent: Jun. 22, 2004

(54) TELEPHONY ACCESS USING AN EMAIL ADDRESS

(75) Inventors: Charles W. Berthoud, Bethlehem, PA (US); Mohd M. Hobbi, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 272 days.

(21) Appl. No.: 09/698,023

(22) Filed: Oct. 30, 2000

(51) Int. Cl.[7] .............................................. H04M 11/00
(52) U.S. Cl. ............................ 379/93.24; 379/93.23; 379/201.01
(58) Field of Search ................ 379/90.01, 93.23–93.28, 379/93.34, 93.02, 93.08, 201.01, 201.02, 219, 220.01, 222, 223, 88.13, 88.14, 88.17, 88.24, 88.25

(56) References Cited

U.S. PATENT DOCUMENTS

| | | | |
|---|---|---|---|
| 4,734,931 A | | 3/1988 | Bourg et al. |
| 5,204,894 A | * | 4/1993 | Darden ..................... 379/88.24 |
| 5,315,705 A | | 5/1994 | Iwami et al. |
| 5,483,352 A | | 1/1996 | Fukuyama et al. |
| 5,509,000 A | | 4/1996 | Oberlander |
| 5,805,810 A | | 9/1998 | Maxwell |
| 5,944,787 A | | 8/1999 | Zoken |
| 6,104,789 A | * | 8/2000 | Lund ....................... 379/93.23 |

FOREIGN PATENT DOCUMENTS

JP            10-178051      *   6/1998

* cited by examiner

Primary Examiner—Wing Chan

(57) ABSTRACT

A method and apparatus for placing a telephone call is provided in which an email address is used to identify an intended recipient of the call and initiate a telephone connection. An email address is input and transmitted to an email address receiver. A telephone number is determined by a central communications provider via accessing a database or series of databases of telephone numbers associated with the email address. The telephone number thus determined is dialed to connect the user with the intended recipient.

58 Claims, 2 Drawing Sheets

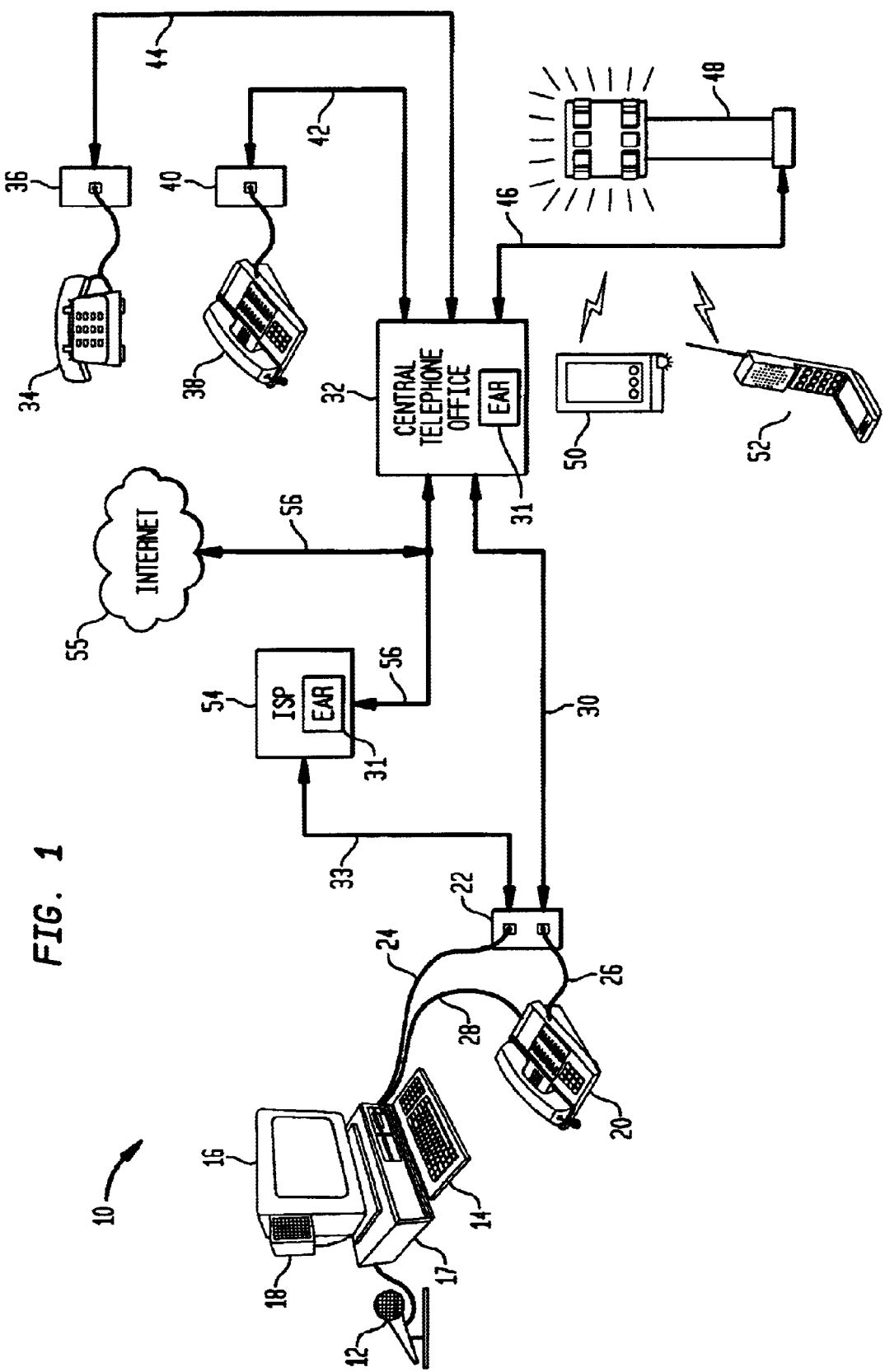

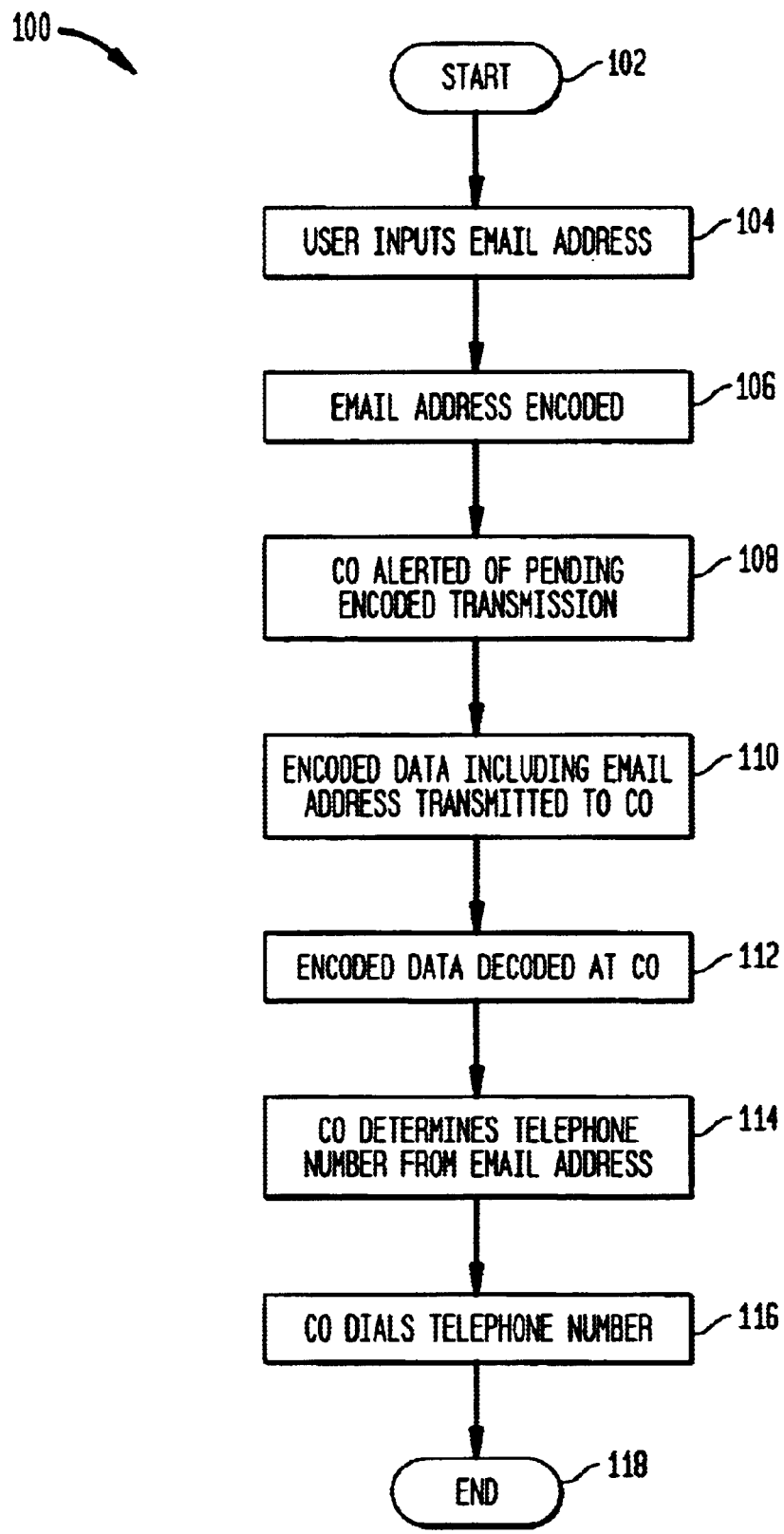

TELEPHONY ACCESS USING AN EMAIL ADDRESS

FIELD OF THE INVENTION

This invention relates to telephone communications and, more particularly, to placing a telephone call using an email address of the intended call recipient.

BACKGROUND OF THE INVENTION

Conventional telephone systems include facilities for reaching persons by telephone using a variety of different access methods. A system user may reach a desired call recipient by dialing the recipient's telephone number or extension directly, by dialing the operator and supplying a name or other identifying information for the recipient, or by using other access methodologies permitting dynamic location of the intended recipient within a telecommunications network. These methods vary in terms of ease of use, specifically with reference to the information that must be supplied by the system user in order to place a call to an intended recipient.

In a typical telephone system, a user must know the telephone number and/or extension number associated with the intended recipient in order to place a call. Alternatively, the user may seek operator assistance in determining the telephone number and/or extension, but additional information may be required (e.g., geographical location of the recipient). The proliferation of geographically-based telephone number directories may reduce the effectiveness of such assistance. Thus, a user may spend a large amount of time and effort locating the correct telephone number or extension associated with an intended recipient.

Thus, there is a need and desire for a telephone service allowing a user to place a telephone call to any intended recipient, regardless of geographic location or business affiliation, using only convenient identifying information. One example of convenient identifying information for a potential call recipient is the email address. A recipient's email address typically is unique, may be used to locate the recipient anywhere in the world without further operator assistance, and normally is easily-remembered or conveniently accessible to a user wishing to contact the recipient. Therefore, there is a need and desire for a telephone service permitting a user to place a telephone call to any intended recipient using the recipient's email address to initiate the call.

SUMMARY OF THE INVENTION

A method and apparatus for placing a telephone call is provided in which an email address may be used to identify the intended recipient of the call and initiate a telephone connection.

In the method aspects of the invention, an email address is input and transmitted to an email address receiver, for example at a central telephone office or an internet service provider. Using the email address, a telephone number for the intended recipient is determined by accessing a database or series of databases of telephone numbers associated with each email address. The email address/telephone number database may be provided by a telephone service provider (TSP) or by an internet service provider (ISP), or both. The telephone number thus determined is dialed to connect the user with the intended recipient.

In the apparatus aspects of the invention, an input device, for example a computer or a telephone, may be used to input an email address of an intended recipient of a telephone call. The input device may include specialized hardware and/or software, for example devices that perform frequency shift key signaling, for transmitting the email address to an email address receiver at a telephone service provider (TSP) or internet service provider (ISP). At the ISP or TSP, a database or series of databases is used to determine at least one telephone number associated with the transmitted email address and establish a telephone connection to the intended recipient.

BRIEF DESCRIPTION OF THE DRAWINGS

FIG. 1 illustrates a portion of a system for placing a telephone call in accordance with an embodiment of the invention; and FIG. 2 illustrates a partial block diagram of the method of an embodiment of the invention.

DETAILED DESCRIPTION OF THE PREFERRED EMBODIMENTS

The invention will now be described with reference to its apparatus aspects as illustrated in FIG. 1. A user initiates a telephone call to an intended recipient by first inputting the recipient's email address using an input device. One exemplary input device is a computer 17 having input/output devices such as a keyboard 14, a display 16, a microphone 12, and a speaker 18. Other exemplary input devices include a personal digital assistant 50, a cellular telephone, 52, and a telephone 20.

It is to be noted that the invention permits an email address to be input using a conventional telephone keypad. For example, each of the twelve keys on the conventional telephone keypad may be assigned to one or more of the alphanumeric characters that may appear in a typical email address (e.g., letters a–z, digits 0–9, "@" and "."). In addition, the conventional telephone keys may be assigned to specific strings of alphanumeric characters that commonly appear in an email address (e.g., ".com", ".edu", ".gov"), or any other string of alphanumeric characters desired by the user. Using the conventional telephone keypad, a user may input a sequence of keystrokes that corresponds to the email address of the intended recipient of a telephone call.

Moreover, the invention may not require that an entire email address be input, for example using the conventional telephone keypad in the manner described above. Instead, the user may be required to enter only a portion of the email address using a sequence of keystrokes sufficient to distinguish the intended recipients' email address. For example, a minimum distinguishing portion of the email address may be input in a manner similar to the popular PBX extension-locating directory function in which a caller may locate an employee's extension merely by inputting a sequence of keys corresponding to the first few letters of the employee's name. The invention extends this popular function by permitting an email address not related to a person's name (e.g., superguy@lucent.com) to be used to initiate a telephone call to an intended recipient. After input of the minimum distinguishing portion of the email address, the remainder of the email address may be apparent from the previously-received key sequence and the email address may be determined and transmitted.

The email address of the recipient is transmitted via a network, for example using telephone network connections 30, to the central telephone office 32 of the local telephone service provider (TSP), where the email address is received at an email address receiver (EAR) 31. Alternatively, the email address may be received at an email address receiver (EAR) 31 at an internet service provider (ISP) 54.

A connection destination (e.g., a telephone number) is determined from the email address of the intended recipient and a telephone call is placed to the connection destination thus determined. Connection destination information may be determined from the email address using a database or series of databases located at the central telephone office 32, internet service provider 54, or at several different locations connected by a network 56. For example, prior to placing the call, connection destination information for an intended recipient may be gathered by accessing a series of information sources available over the Internet 55. Once all of the appropriate connection destinations for the intended recipient are identified, a call may be placed to a selected one or a group of connection destinations (e.g., telephone numbers) associated with the intended recipient.

Exemplary connection destinations may include a standard analog telephone 34, a digital telephone 38, a cellular telephone 52, and a personal digital assistant 50. The telephone call may be placed with the aid of many different telecommunications networks, such as a cellular network 46 including a cellular antenna 48, a digital telephone network 42 including a digital telephone connection 40, and a standard telephone network 44 including a standard analog telephone connection 36.

The invention will now be described according to its method aspects as illustrated in FIG. 2. Referring to FIG. 2, an input device may be used to input an email address (block 104) of an intended recipient of a telephone call. Alternatively, as noted other methods and devices for inputting the email address may be used in accordance with the invention, including speaking into a microphone 12, using a digital telephone 20, using a cellular telephone 52, and using a personal digital assistant 50 (FIG. 1). For simplicity the invention will be described for an input device including a computer 17 having at least a keyboard 14 and a display 16.

As shown in block 106 the email address may be encoded after input for transmission to the email address receiver 31 (FIG. 1). The email address is transmitted (block 110) from the input device 14 (FIG. 1) through communications lines, for example network connection 24 and network transmission lines 30 (FIG. 1), to an email address receiver (EAR) 31 (FIG. 1), which may be located, for example, at a central telephone office 32 or at an internet service provider 54. The transmission of the email address may be accomplished using a variety of signaling techniques well known in the art. One exemplary technique is frequency shift key (FSK) signaling, which is able to transmit a unique code for each of the numbers, letters, and other symbols that may appear in a typical email address. FSK signaling would be preferred over other types of signaling common in the telecommunications art, such as dual-tone multiple frequency (DTMF) signaling which does not transmit a unique code for each letter, number, and other symbol.

As shown in block 108, the user may also notify the receiver 31 of the nature of the transmission. This notification preferably occurs prior to the transmission as illustrated in FIG. 2, but may occur at any time for a compatible receiver 31. For example, the transmission operation may include dialing a designated telephone number of the email address receiver 31 and then commencing transmission of the email address. For another example, the transmission operation may include transmitting a designated access code using DTMF, FSK, or other signaling techniques prior to or immediately after the email address is transmitted. For a third example, the transmission operation may include using a specialized device for transmitting email address transmissions to the email address receiver 31. The transmitted email address may be contained in a data packet containing other information used by the network, such as destination address information, transmitter address information, priority codes, and/or notification information of the type described.

After transmission, the email address may be decoded (block 112) at the receiver 31 to determine the contents of the transmission and identify the intended recipient. For example, if FSK signaling is used by the transmitting user, the email address receiver 31 (FIG. 1) may use corresponding techniques to decode the FSK-encoded email address.

The email address thus received is used to determine at least one connection destination associated with the email address (block 114). As noted, a database or series of databases provided by a local TSP 32 or by an ISP 54 may be used, as well as any number of information sources available over the internet 55 or other communications network or series of networks. Each information source may be searched to locate the email address received, and any associated connection destination information (e.g., telephone numbers) may be saved for later use or for presentation to the user for selecting among alternatives. Once a desired connection destination is determined at block 114, a telephone call is placed to the connection destination at block 116.

In addition, a call may be initiated in accordance with the invention using a network or protocol separate from the telecommunications network commonly used to place a telephone call. For example, an originating user may enter an email address of an intended recipient and transmit it via the Internet 55 using a cable modem over a cable network 33 to an ISP 54 and/or TSP 30, which in turn may initiate a first call to the intended recipient, initiate a second call to the originating user's telephone 20, and hand the first call off to the originating user.

Alternatively, the use of network telephony, for example "voice-over-IP" technology, may obviate the need for the second call to the originating user's telephone 20 for a network-initiated call. For example, an originating user may input an email address using a home computer 17 connected to the Internet 55 via a modem connection 24 to an Internet Service Provider (ISP) 54, transmit the email address to the ISP 54 or TSP 32 that offers email-address initiation of a telephone call, and thereafter use internet telephony software or hardware installed in the home computer 17 and at the ISP/TSP 54, 32 to speak to the destination party. In this example, the ISP 54 or TSP 32 offering the email-address calling service may call the destination party via the conventional telephone network and set up a connection back to the originating user via network telephony over the home computer's internet connection, for example using two-way analog-to-digital conversion and packetized digital data communications (e.g., "voice-over-IP") with the originating user.

In the preceding discussion, the apparatus and method of the invention has been described with regard to placing a telephone call using a telephone number determined from an email address of an intended recipient of the call. However, the present invention may be used with other telephone systems that do not require a standard telephone number, such as business public branch exchange (PBX) networks that require as input only an abbreviated extension, or intercom or radio systems that require inputs not related to any telephone number.

While the invention has been described and illustrated with reference to exemplary embodiments, many variations can be made and equivalents substituted without departing from the spirit or scope of the invention. Accordingly, the invention is not to be understood as being limited by the foregoing description, but is only limited by the scope of the appended claims.

What is claimed as new and desired to be protected by Letters Patent of the United States is:

1. A method of establishing a telephone connection, comprising:
   receiving at a first device at least a portion of an email address associated with a party to be called;
   receiving said at least a portion of an email address at a central communications provider;
   determining at least one telephone number associated with said party to be called; and
   setting up a telephone connection between said first input device and said party to be called with said at least one telephone number.

2. A method as in claim 1, wherein said email address is received from a cellular telephone.

3. A method as in claim 1, wherein said setting up of said telephone connection includes permitting said at least one telephone number to be dialed.

4. A method as in claim 1, wherein said setting up of said telephone connection includes causing said at least one telephone number to be dialed.

5. A method as in claim 1, further comprising receiving notification of a pending email address communication prior to said receiving of said email address.

6. A method as in claim 5, wherein said receiving of said notification includes using a designated device for communicating pending email address communications.

7. A method as in claim 5, wherein said receiving of said notification includes receiving an access code.

8. A method as in claim 5, wherein said receiving of said notification includes receiving a telephone connection to a telephone number designated for receiving email address communications.

9. A method as in claim 1, wherein said receiving of said email address includes receiving an encoded email address.

10. A method as in claim 9, wherein said email address is encoded using frequency-shift key signaling.

11. A method as in claim 9, wherein said determining of said at least one telephone number includes decoding said encoded email address.

12. A method as in claim 1, wherein said determining of said at least one telephone number includes looking up said email address in a database and retrieving at least one telephone number associated with said email address.

13. A method as in claim 12, wherein at least a portion of said database is provided by a telephone service provider (TSP).

14. A method as in claim 12, wherein at least a portion of said database is provided by an internet service provider (ISP).

15. A method as in claim 1, wherein said receiving of said email address includes receiving a data packet that includes said email address.

16. A method as in claim 1, wherein said email address is received from a computer.

17. A method as in claim 1, wherein said email address is received from a telephone.

18. A method as in claim 17, wherein said email address is represented by a sequence of key selections on a keypad of said telephone.

19. A method as in claim 1, wherein said email address is received from a personal digital assistant.

20. A method of establishing a telephone connection, the method comprising:
   receiving at a central communications provider at least a portion of an email address over a computer network, said at least a portion of an email address being input into an email address input device by a first user, said email address input device being part of said computer network;
   determining at least one telephone number associated with said email address;
   initiating a first telephone call to said telephone number associated with said email address;
   initiating a second telephone call to said first user; and
   connecting said first telephone call to said second telephone call.

21. A method of initiating a telephone connection, comprising:
   providing at least a portion of an email address of a party to be called to a first input device;
   transmitting said at least a portion of said email address to a central communications provider; and
   setting up a telephone connection between said first input device and said party to be called with at least one telephone number associated with said email address.

22. A method as in claim 21, wherein said email address is transmitted using a cellular telephone.

23. A method as in claim 21, wherein said using of said at least one telephone number includes permitting said at least one telephone number to be dialed.

24. A method as in claim 21, wherein said using of said at least one telephone number includes causing said at least one telephone number to be dialed.

25. A method as in claim 21, further comprising transmitting notification of a pending email address communication prior to said transmitting of said email address.

26. A method as in claim 25, wherein said transmitting of said notification includes using a designated device for communicating pending email address communications.

27. A method as in claim 25, wherein said transmitting of said notification includes transmitting an access code.

28. A method as in claim 25, wherein said transmitting of said notification includes initiating a telephone connection to a telephone number designated for receiving email address communications.

29. A method as in claim 21, wherein said transmitting of said email address includes transmitting an encoded email address.

30. A method as in claim 29, wherein said email address is encoded using frequency-shift key signaling.

31. A method as in claim 21, wherein said transmitting of said email address includes transmitting a data packet that includes said email address.

32. A method as in claim 21, wherein said at least one telephone number is determined via said central communications provider by looking up said email address in a database and retrieving at least one telephone number associated with said email address.

33. A method as in claim 32, wherein at least a portion of said database is provided by a telephone service provider (TSP).

34. A method as in claim 32, wherein at least a portion of said database is provided by an internet service provider (ISP).

35. A method as in claim 21, wherein said email address is transmitted using a computer.

36. A method as in claim 21, wherein said email address is transmitted using a telephone.

37. A method as in claim 36, wherein said email address is represented by a sequence of key selections on a keypad of said telephone.

38. A method as in claim 21, wherein said email address is transmitted using a personal digital assistant.

39. A method of establishing a telephone connection, the method comprising:
   receiving at a central communications provider at least a portion of an email address over a computer network, said at least a portion of an email address being input into an email address input device by a first user, said email address input device being part of said computer network;
   determining at least one telephone number associated with said email address;
   initiating a first call to said telephone number associated with said email address; and
   connecting said first call to said email address input device using network telephony.

40. An apparatus for establishing a telephone connection, comprising:
   means for receiving at least a portion of an email address from a first user;
   means for determining at least one telephone number associated with said email address, said at least one telephone number being associated with a second user different from said first user; and
   means for setting up a telephone connection between said first user and said second user with said at least one telephone number.

41. An apparatus for initiating a telephone connection, comprising:
   means for providing at least a portion of an email address of a party to be called to a first input device;
   means for transmitting said at least a portion of said email address to a central communications provider; and
   means for setting up a telephone connection between said first input device and said party to be called with at least one telephone number associated with said email address.

42. An apparatus for establishing a telephone connection, comprising:
   a receiver at a central communications provider that receives at least a portion of an email address from a first input device, said at least a portion of an email address being associated with a party to be called;
   a cross-referencing device that determines at least one telephone number associated with said email address; and
   a destination input device that sets up a telephone connection between said first input device and said party to be called with said at least one telephone number.

43. An apparatus for initiating a telephone connection, comprising:
   an input device that receives input of at least a portion of an email address input by a user;
   a transmitter that communicates at least said portion of said email address to an email address receiver at a central communications provider; and
   a transfer device that sets up a telephone connection between at least one telephone number associated with said email address and said user.

44. A system for making a telephone call, the system comprising:
   an email address input device that receives at least a portion of an email address input by a user;
   a transmitter that communicates at least said portion of said email address to an email address receiver at a central communications provider;
   a cross-referencing device that determines at least one telephone number associated with said email address;
   a telephone number input device that accepts as input said at least one telephone number associated with said email device and dials said at least one telephone number; and
   a transfer device that sets up a telephone connection between said at least one telephone number associated with said email address and said user.

45. A system as in claim 44, wherein said transmitter is constructed to transmit notification of a pending email address transmission.

46. A system as in claim 45, wherein said transmitter transmits said notification prior to communicating said email address to said email address receiver.

47. A system as in claim 45, wherein said notification includes transmission of an access code.

48. A system as in claim 45, wherein said notification includes dialing a designated telephone number for receiving email address communications.

49. A system as in claim 44, wherein said transmitter is constructed to transmit said email address using frequency shift key signaling.

50. A system as in claim 44, wherein said cross-referencing device includes a database containing email addresses and associated telephone numbers.

51. A system as in claim 50, wherein said central communications provider is a telephone service provider (TSP).

52. A system as in claim 50, wherein said central communications provider is an internet service provider (ISP).

53. A system as in claim 44, wherein said transmitter communicates said email address by transmitting a data packet containing at least said email address.

54. A system as in claim 44, wherein said email address input device includes a computer keyboard.

55. A system as in claim 44, wherein said email address input device includes a telephone.

56. A system as in claim 55, wherein said email address is represented by a sequence of key selections on a keypad of said telephone.

57. A system as in claim 44, wherein said email address input device includes a personal digital assistant.

58. A system as in claim 44, wherein said email address input device includes a cellular telephone.

* * * * *